United States Patent
Roberts et al.

(10) Patent No.: US 7,215,638 B1
(45) Date of Patent: May 8, 2007

(54) SYSTEM AND METHOD TO PROVIDE 911 ACCESS IN VOICE OVER INTERNET PROTOCOL SYSTEMS WITHOUT COMPROMISING NETWORK SECURITY

(75) Inventors: Robin U. Roberts, Orlando, FL (US); Donald L. Joslyn, DeBary, FL (US)

(73) Assignee: MeshNetworks, Inc., Maitland, FL (US)

( * ) Notice: Subject to any disclaimer, the term of this patent is extended or adjusted under 35 U.S.C. 154(b) by 954 days.

(21) Appl. No.: 10/173,821

(22) Filed: Jun. 19, 2002

(51) Int. Cl.
*H04J 1/16* (2006.01)
*G06F 11/00* (2006.01)
*H01R 31/08* (2006.01)

(52) U.S. Cl. ............... 370/231; 370/230; 370/231.1; 370/235; 370/236; 370/349; 370/352; 370/338; 455/404.1; 455/406

(58) Field of Classification Search ............ None
See application file for complete search history.

(56) References Cited

U.S. PATENT DOCUMENTS

| | | | |
|---|---|---|---|
| 4,494,192 A | 1/1985 | Lew et al. ................ 364/200 |
| 4,617,656 A | 10/1986 | Kobayashi et al. ........... 370/74 |
| 4,736,371 A | 4/1988 | Tejima et al. ................ 370/95 |
| 4,742,357 A | 5/1988 | Rackley ..................... 342/457 |
| 4,747,130 A | 5/1988 | Ho ............................ 379/269 |
| 4,910,521 A | 3/1990 | Mellon ....................... 342/45 |
| 5,034,961 A | 7/1991 | Adams ........................ 375/130 |
| 5,068,916 A | 11/1991 | Harrison et al. ............. 455/39 |
| 5,231,634 A | 7/1993 | Giles et al. ................. 370/95.1 |
| 5,233,604 A | 8/1993 | Ahmadi et al. ............... 370/60 |
| 5,241,542 A | 8/1993 | Natarajan et al. ........... 370/95.3 |
| 5,317,566 A | 5/1994 | Joshi ........................... 370/60 |
| 5,392,450 A | 2/1995 | Nossen ....................... 455/12.1 |
| 5,412,654 A | 5/1995 | Perkins ...................... 370/94.1 |
| 5,424,747 A | 6/1995 | Chazelas ..................... 342/70 |
| 5,502,722 A | 3/1996 | Fulghum ..................... 370/69.1 |
| 5,517,491 A | 5/1996 | Nanni et al. ................ 370/29 |
| 5,555,425 A | 9/1996 | Zeller et al. ................ 395/800 |
| 5,555,540 A | 9/1996 | Radke ........................ 370/16.1 |
| 5,572,528 A | 11/1996 | Shuen ........................ 370/85.13 |

(Continued)

FOREIGN PATENT DOCUMENTS

CA 2132180 3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Chi Pham
*Assistant Examiner*—Raj Jain
(74) *Attorney, Agent, or Firm*—Randi L. Karpinia; Joseph J. Buczynski

(57) ABSTRACT

A system and method to provide emergency call access in Voice over Internet Protocol (VoIP) systems without compromising network security. The system and method enables VoIP emergency signal detection at a user device, and transmission of the VoIP emergency signal from the user node to a network server node through the use of data encapsulation and decapsulation (or "tunneling"), allowing VoIP data routing via an IP transport layer regardless of access or network security restrictions.

16 Claims, 3 Drawing Sheets

U.S. PATENT DOCUMENTS

| | | |
|---|---|---|
| 5,615,212 A | 3/1997 | Ruszczyk et al. ............ 370/433 |
| 5,618,045 A | 4/1997 | Kagan et al. ................. 463/40 |
| 5,621,732 A | 4/1997 | Osawa ........................ 370/79 |
| 5,623,495 A | 4/1997 | Eng et al. ................... 370/397 |
| 5,627,976 A | 5/1997 | McFarland et al. ......... 395/308 |
| 5,631,897 A | 5/1997 | Pacheco et al. ............. 370/237 |
| 5,644,576 A | 7/1997 | Bauchot et al. ............. 370/437 |
| 5,652,751 A | 7/1997 | Sharony ..................... 370/227 |
| 5,680,392 A | 10/1997 | Semaan ..................... 370/261 |
| 5,684,794 A | 11/1997 | Lopez et al. ................ 370/337 |
| 5,687,194 A | 11/1997 | Paneth et al. ............... 375/283 |
| 5,696,903 A | 12/1997 | Mahany ................. 395/200.58 |
| 5,701,294 A | 12/1997 | Ward et al. ................. 370/252 |
| 5,706,428 A | 1/1998 | Boer et al. .................. 395/200 |
| 5,717,689 A | 2/1998 | Ayanoglu ................... 370/349 |
| 5,745,483 A | 4/1998 | Nakagawa et al. ......... 370/335 |
| 5,774,876 A | 6/1998 | Wooley et al. ................ 705/28 |
| 5,781,540 A | 7/1998 | Malcolm et al. ............ 370/321 |
| 5,787,080 A | 7/1998 | Hulyalkar et al. .......... 370/348 |
| 5,794,154 A | 8/1998 | Bar-On et al. .............. 455/509 |
| 5,796,732 A | 8/1998 | Mazzola et al. ............. 370/362 |
| 5,796,741 A | 8/1998 | Saito et al. .................. 370/439 |
| 5,805,593 A | 9/1998 | Busche ....................... 370/396 |
| 5,805,842 A | 9/1998 | Nagaraj et al. ............. 395/306 |
| 5,805,977 A | 9/1998 | Hill et al. ................... 455/31.3 |
| 5,809,518 A | 9/1998 | Lee ............................ 711/115 |
| 5,822,309 A | 10/1998 | Ayanoglu et al. ........... 370/315 |
| 5,844,905 A | 12/1998 | McKay et al. .............. 370/443 |
| 5,845,097 A | 12/1998 | Kang et al. ................. 395/297 |
| 5,857,084 A | 1/1999 | Klein .......................... 395/309 |
| 5,870,350 A | 2/1999 | Bertin et al. ................ 365/233 |
| 5,877,724 A | 3/1999 | Davis .......................... 342/357 |
| 5,881,095 A | 3/1999 | Cadd .......................... 375/202 |
| 5,881,372 A | 3/1999 | Kruys ......................... 455/113 |
| 5,886,992 A | 3/1999 | Raatikainen et al. ....... 370/410 |
| 5,896,561 A | 4/1999 | Schrader et al. ........... 455/67.1 |
| 5,903,559 A | 5/1999 | Acharya et al. ............. 370/355 |
| 5,909,651 A | 6/1999 | Chander et al. ............. 455/466 |
| 5,936,953 A | 8/1999 | Simmons .................... 370/364 |
| 5,943,322 A | 8/1999 | Mayor et al. ............... 370/280 |
| 5,987,011 A | 11/1999 | Toh ............................ 370/331 |
| 5,987,033 A | 11/1999 | Boer et al. .................. 370/445 |
| 5,991,279 A | 11/1999 | Haugli et al. ............... 370/311 |
| 6,028,853 A | 2/2000 | Haartsen ..................... 370/338 |
| 6,029,217 A | 2/2000 | Arimilli et al. ............. 710/107 |
| 6,034,542 A | 3/2000 | Ridgeway .................... 326/39 |
| 6,044,062 A | 3/2000 | Brownrigg et al. ......... 370/238 |
| 6,047,330 A | 4/2000 | Stracke, Jr. ................. 709/238 |
| 6,052,594 A | 4/2000 | Chuang et al. .............. 455/450 |
| 6,052,752 A | 4/2000 | Kwon ......................... 710/126 |
| 6,064,626 A | 5/2000 | Stevens ....................... 365/233 |
| 6,067,291 A | 5/2000 | Kamerman et al. ......... 370/338 |
| 6,073,005 A | 6/2000 | Raith et al. ................. 455/404 |
| 6,078,566 A | 6/2000 | Kikinis ....................... 370/236 |
| 6,104,712 A | 8/2000 | Robert et al. ............... 370/389 |
| 6,108,738 A | 8/2000 | Chambers et al. .......... 710/113 |
| 6,115,580 A | 9/2000 | Chuprun et al. ................ 455/1 |
| 6,122,690 A | 9/2000 | Nannetti et al. ............ 710/102 |
| 6,130,881 A | 10/2000 | Stiller et al. ................ 370/238 |
| 6,132,306 A | 10/2000 | Trompower ................ 453/11.1 |
| 6,147,975 A | 11/2000 | Bowman-Amuah ......... 370/252 |
| 6,163,699 A | 12/2000 | Naor et al. .................. 455/453 |
| 6,178,337 B1 | 1/2001 | Spartz et al. ................ 455/561 |
| 6,192,053 B1 | 2/2001 | Angelico et al. ............ 370/448 |
| 6,192,230 B1 | 2/2001 | Van Bokhorst et al. ...... 455/343 |
| 6,208,870 B1 | 3/2001 | Lorello et al. .............. 455/466 |
| 6,223,240 B1 | 4/2001 | Odenwald et al. .......... 710/129 |
| 6,240,294 B1 | 5/2001 | Hamilton et al. ........... 455/456 |
| 6,246,875 B1 | 6/2001 | Seazholtz et al. ........... 455/432 |
| 6,249,516 B1 | 6/2001 | Brownrigg et al. ......... 370/338 |
| 6,275,707 B1 | 8/2001 | Reed et al. .................. 455/456 |
| 6,285,892 B1 | 9/2001 | Hulyalkar ................... 455/574 |
| 6,304,556 B1 | 10/2001 | Haas .......................... 370/254 |
| 6,327,300 B1 | 12/2001 | Souissi et al. .............. 375/219 |
| 6,349,091 B1 | 2/2002 | Li ............................... 370/238 |
| 6,349,210 B1 | 2/2002 | Li ............................... 455/450 |
| 6,363,065 B1 | 3/2002 | Thornton et al. ........... 370/352 |
| 2001/0053699 A1 | 12/2001 | McCrady et al. ........... 455/513 |
| 2002/0085538 A1* | 7/2002 | Leung ........................ 370/352 |
| 2002/0146129 A1* | 10/2002 | Kaplan ....................... 380/270 |
| 2003/0095535 A1* | 5/2003 | Le et al. ..................... 370/349 |
| 2004/0203563 A1* | 10/2004 | Menard ................... 455/404.1 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarachically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna Aceves, "Collision-Avoidance Transmission Scheduling for Ad-Hoc Networks".

George Vardakas and Wendell Kishaba, "Qos Networking With Adaptive Link Control and Tactical Multi-Channel Software Radios".

Henning Schulzrinne, "Providing Emergency Call Services For SIP-based Internet Telephony".

W. Simpson, "IP In IP Tunneling", RFC 1853 Document.

C. Perkins, "IP Encapsulation Within IP", RFC 2003 Document.

* cited by examiner

SYSTEM AND METHOD TO PROVIDE 911 ACCESS IN VOICE OVER INTERNET PROTOCOL SYSTEMS WITHOUT COMPROMISING NETWORK SECURITY

BACKGROUND OF THE INVENTION

1. Field of the Invention

The present invention relates to a system and method for emergency access in Voice over Internet Protocol systems (VoIP), allowing limited communication connections when access is not otherwise authorized. Specifically, the present invention relates to a system and method for recognizing 911 emergency call requests and establishing and controlling a limited connection between the requesting device and server.

2. Description of the Related Art

A predominant goal of 911 access is the ubiquitous availability to emergency services. For both existing wired and wireless telephony services, 911 access is mandated from any device that has access to service, regardless of the user's subscription status or service restrictions.

For a wired telephone, when there is dial-tone present the network must permit a 911 call to be made. In the case of wireless telephones, if the handset can "see" the wireless system, the system must permit the handset to generate a 911 call. Both of these situations result as both networks can readily detect a request for a 911 call or a location specific Enhanced 911 (E911) call.

For Voice over Internet Protocol services (VoIP), providing 911 access without regard for service status is much more difficult. As can be appreciated by one skilled in the art, Voice over Internet Protocol is a communication technique for transmitting ordinary telephone calls over the Internet using packet-linked routes. A VoIP system captures, packetizes, and transports telephone conversations over a network, such as the Internet, which was originally designed to transport computer-generated data. However, because services such as VoIP are packet-based and use a layered protocol, VoIP communication systems require a software application on the device, such as a personal computer, to enable the device to make a call, and an IP services layer at the network to transport the call. The VoIP application can use one of several different signaling protocols, such as H.323, SIP, or Megaco, to initiate a 911 call and, as a consequence, a request for a 911 call may become embedded in a high-level protocol, which is not easily detected by the IP transport layer.

In providing 911 access, a VoIP client and IP services are assumed to be available and usable at the user device. Any additional capabilities required by the 911 service, such as user identification or caller location for enhanced 911 service (E911), are assumed to be provided by the VoIP client. Further details regarding E911 caller location services are set forth in IETF document entitled "Providing Emergency Call Services For SIP-Based Internet Telephony", Jul. 13, 2000, the entire content being incorporated herein by reference.

The initial identification of 911 calls at a user device may involve the use of a special key on the user device, indicating a 911 call when pressed, or a predetermined key sequence, indicating a 911 call. Further details regarding identifying 911 calls at a user device are described in U.S. Pat. No. 6,073,005 entitled "Systems and Methods For Identifying Emergency Calls In Radio Communication Systems", issued Jun. 6, 2000, the entire content being incorporated herein by reference.

Once a VoIP system 911 call is successfully initiated, existing call switching mechanisms can be used to complete the call. In most cases, a 911 call is merely switched from the IP network to a PSTN network for completion. Details regarding switching VoIP system 911 calls to PSTN networks are described in U.S. Pat. No. 6,363,065 entitled "Apparatus For A Voice Over IP (VoIP) Telephony Gateway And Methods For Use Therein", issued Mar. 26, 2002, the entire content being incorporated herein by reference.

Providing VoIP system 911 call access without regard for service status may require bypassing multiple layers of security and access control in the network. For example, a device may have physical access to a network, such as a LAN, WAN or wireless system, but may not be authorized for IP services over the connection. Even if the device does have IP services available, it may not be authorized for access to the requested VoIP services or equipment. Arbitrary bypasses to security and access controls can be made to allow access, however, this can expose the network to theft of services or other potential attacks.

Accordingly, a need exists for a system and method for 911 access in Voice over IP systems in which 911 call requests are detected and restriction controls may be bypassed without compromising network security.

SUMMARY OF THE INVENTION

An object of the present invention is to provide a system and method for detection of a 911 call request from a user device by IP transport layers, regardless of high level signaling protocols used by the device.

Another object of the present invention is to provide a system and method for establishing a limited connection between a 911 call requesting user device and a network server, allowing IP traffic between the device and server while bypassing network security and access restrictions without compromising network security.

A further object of the present invention is to provide a system and method of control over a limited connection made between a 911 call requesting user device and a network server.

These and other objects are substantially achieved by providing a system and method of 911 access where upon the initiation and detection of a request for a 911 call to the network server, the network server establishes a limited connection with the requesting user device. To achieve this, the network layer at the requesting user device detects the 911 call request and initiates a request to a network server for a 911 call. The network server determines whether any special handling is required, and if so, establishes and controls an IP tunnel to the requesting device.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE PREFERRED EMBODIMENTS

Figure 1:
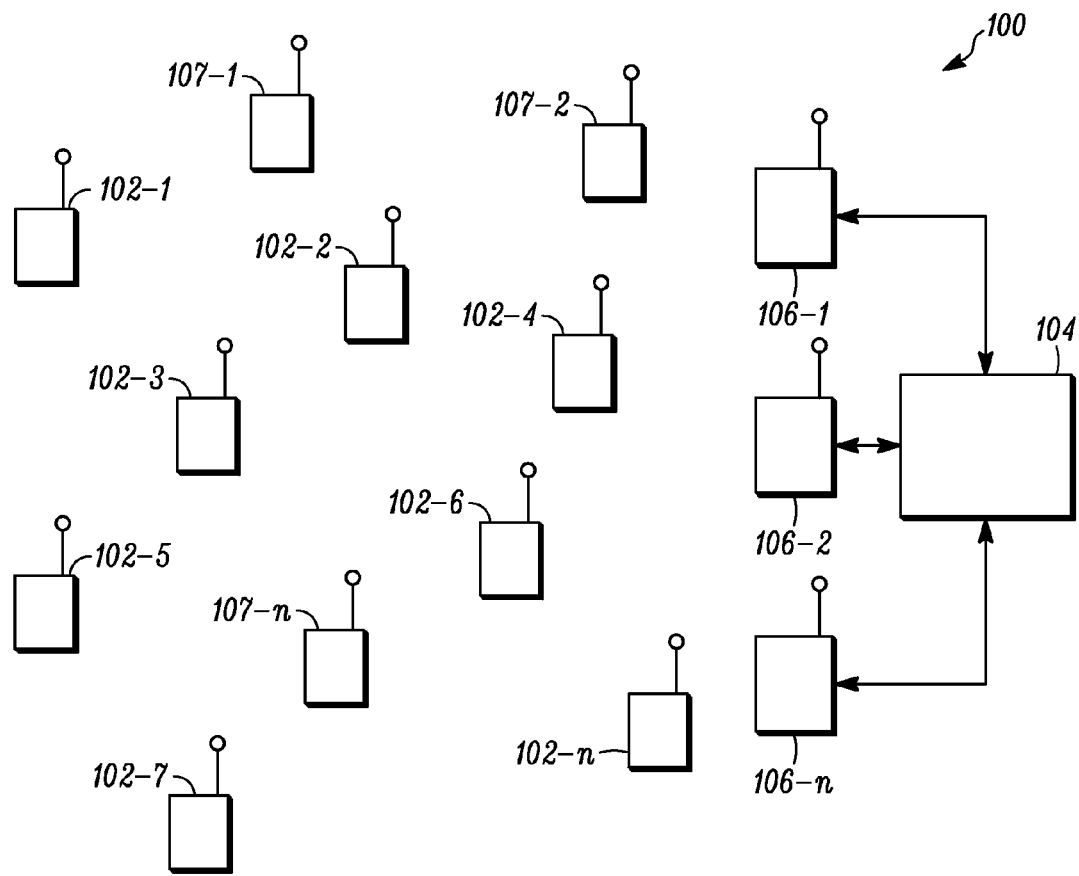
FIG. 1 is a block diagram of an example of an ad-hoc wireless communications network including a plurality of nodes employing an embodiment of the present invention.
Figure 2:
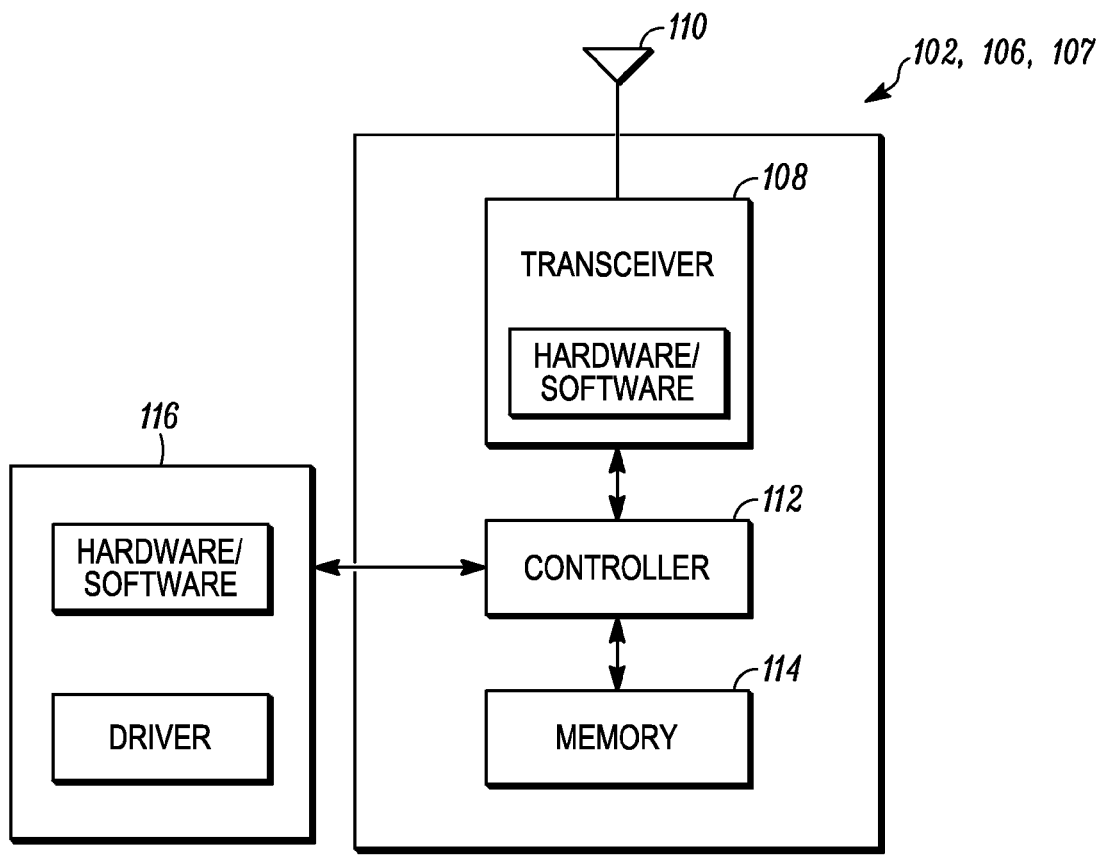
FIG. 2 is a block diagram of an example of a wireless node as shown in FIG. 1.

FIG. 1 is a block diagram illustrating an example of an ad-hoc packet-switched wireless communications network 100 employing an embodiment of the present invention. FIGS. 1 and 2 illustrate an implementation of one embodiment of the present invention using a wireless ad-hoc network configuration, and are not intended to limit the application of the present invention to ad-hoc networks or wireless devices. Additional embodiments of the present invention may be implemented in a wide range of network configurations, such as wired local area networks and associated devices in the manner described below.

In the embodiment shown in FIG. 1, the network 100 includes a plurality of mobile wireless user terminals 102-1 through 102-n (referred to generally as nodes or mobile nodes 102), and a fixed network 104 having a plurality of access points 106-1, 106-2, ... 106-n (referred to generally as nodes or access points 106), for providing the nodes 102 with access to the fixed network 104. The fixed network 104 includes, for example, a core local access network (LAN), and a plurality of servers and gateway routers, to provide the nodes 102 with access to other networks, such as other ad-hoc networks, the public switched telephone network (PSTN) and the Internet. The network 100 further includes a plurality of fixed routers 107-1 through 107-n (referred to generally as nodes or fixed routers 107) for routing data packets between other nodes 102, 106 or 107. As stated above, additional embodiments of the present invention may be implemented using other network configurations, such as wired local area networks.

As can be appreciated by one skilled in the art, the nodes 102, 106 and 107 are capable of communicating with each other directly, or via one or more other nodes 102, 106 or 107 operating as a router or routers for data packets being sent between nodes, as described in U.S. Pat. No. 5,943,322 entitled "Communications Method For A Code Division Multiple Access System Without A Base Station", issued Aug. 24, 1999, the entire content being incorporated herein by reference. Further details of these types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, and in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, the entire content of both applications being incorporated herein by reference.

Specifically, as shown in FIG. 2, each node 102, 106 and 107 includes a transceiver 108 which is coupled to an antenna 110 and is capable of receiving and transmitting signals, such as packetized data signals, to and from the node 102, 106 or 107, under the control of a controller 112. The packetized data signals can include, for example, voice, data or multimedia information. The nodes described above are generally adapted for use in wireless networks, however other node configurations may be used in additional embodiments of the present invention when different network configurations, such as wired local area networks, are used to implement the present invention.

Each node 102, 106 and 107 further includes a memory 114, such as a random access memory (RAM), that is capable of storing, among other things, routing information pertaining to itself and other nodes 102, 106 or 107 in the network 100. The nodes 102, 106 and 107 exchange their respective routing information, referred to as routing advertisements or routing table information, with each other periodically via a broadcasting mechanism, for example, when a new node 102 enters the network 100, or when existing nodes 102 in the network 100 move.

As further shown in FIG. 2, certain nodes, especially mobile nodes 102, can include a host 116 which may consist of any number of devices, such as a notebook computer terminal, mobile data unit, or any other suitable device. As may be appreciated by one skilled in the art, the majority of VoIP calls are made using a personal computer as a host 116, however any device capable of this purpose may be used. Each node 102, 106 and 107 also includes the appropriate hardware and software to provide Internet Protocol (IP) support, the purposes of which can be readily appreciated by one skilled in the art.

Figure 3:
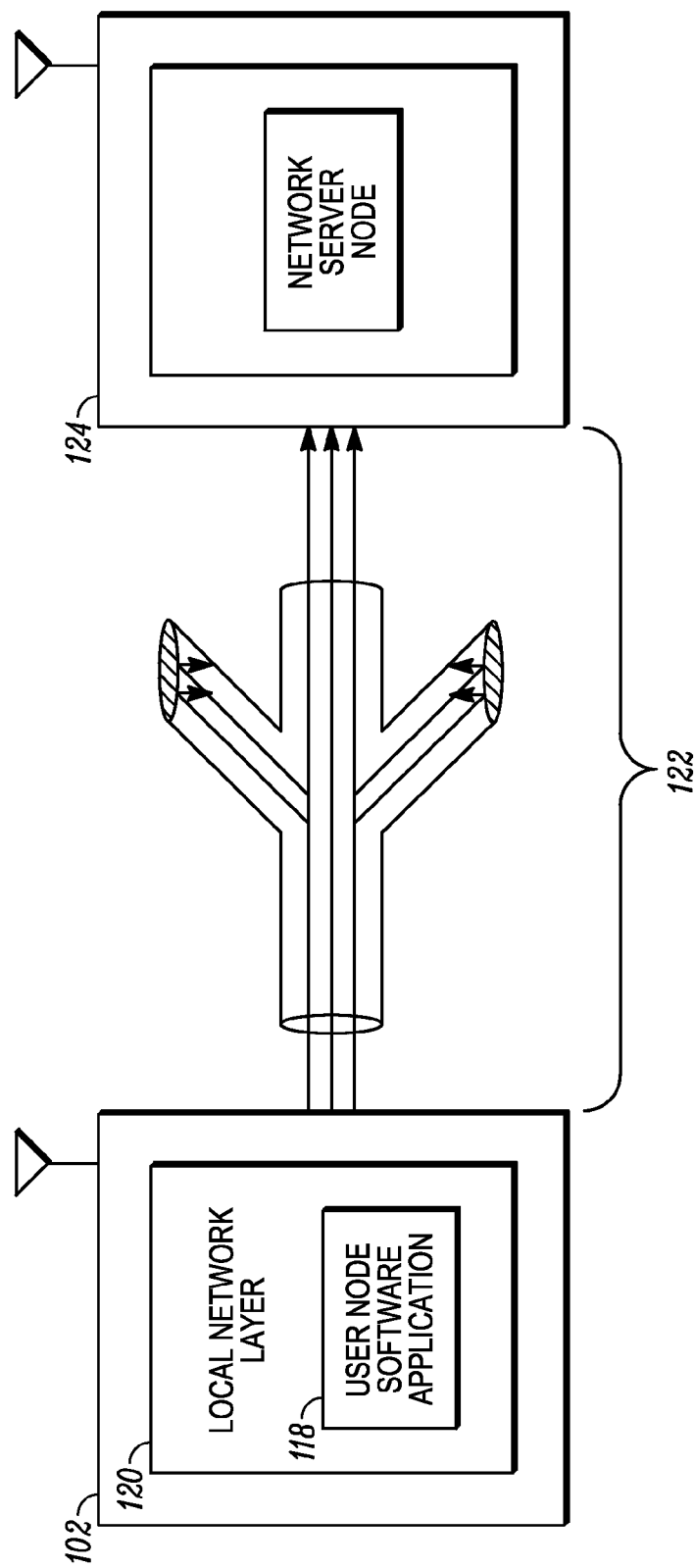
FIG. 3 is a block diagram of an example of the manner in which 911 access between nodes is performed in accordance with an embodiment of the present invention.

FIG. 3 illustrates an example of the manner in which 911 access between nodes is performed in accordance with an embodiment of the present invention. As shown in FIG. 3, each subscriber or user node 102, contains a software application 118 which may be used by the user to initiate a request for an emergency call, such as a 911 or E911 call. The server node 124 may consist of either an access point 106 or fixed network 104 as shown in FIG. 1. Call initiation at the unit 102 may be achieved using a dedicated emergency call button, or using a sequence of activated buttons.

As shown in FIG. 3, a local network layer 120 detects the emergency call request at the node 102 and initiates a request for a 911 call to a network server node 124. The server node 124 upon detection of the emergency call request, establishes a limited connection with the requesting node 102, allowing the server node to safely bypass security and access mechanisms in place while allowing the service or transport layer 122 to block any unauthorized traffic between the user node 102 and the server node 124.

As stated in the Background section, Voice over Internet Protocol is a technique for transmitting calls over the Internet using packet-linked routes and layered protocols. In FIG. 3, node 102 includes a software application 118 to enable the device to make an emergency call, and an IP service or transport layer 122 at the network to transport the call, however the request for an emergency call may become embedded in a high-level protocols at the local network layer 120, which are not easily detected by the IP transport layer 122. Additionally, security and access control at each layer 120 and 122 may restrict access to the server node 124 by the user node 102.

In the embodiment of the present invention shown in FIG. 3, when a user node 102 requests an emergency call, the network layer 120 at node 102 first detects that node 102 is requesting an emergency call to a server node. Network layer 120 can detect such emergency call requests from node 102 in a number of manners, including specific requests from the VoIP application at node 102 to the local network layer, or through network layer snooping within packets from node 102 for emergency call requests.

Upon detection of an emergency call request at node 102, local network layer 120 then initiates a request to a network server node 124 to allow completion of the call. The network server node 124 can be located by the local network layer 120 at either some well-known address, or discovered via a broadcast mechanism by the requesting node 102. As can be appreciated by one skilled in the art, numerous methods exist to identify an appropriate Public Safety Answer Point (PSAP) for an emergency call, and these same mechanisms can be applied to discover the appropriate server node to which the emergency call from node 102 should be directed.

A specific function of server node 124 is the determination of special handling requirements to allow the emergency call from the user node 102 when a request for a call is received from the local network layer 120. As shown in FIG. 3, the local network layer 120 detects an emergency call request from node 102 and initiates a request to server node 124. However, security and access controls at each layer 120 and 122 may restrict access to the server node 124 by the user node 102. When the server node 124 detects a request for an emergency call, the server node determines if special handling is required to allow the call from node 102 due to restrictions or controls at either 120 or 122. Special handling of an emergency call from node 102 may be required if, for example, node 102 is not authorized for access to the requested VoIP services or equipment of the server 124.

If special handling is required, such as bypassing security or access controls, server node 124 establishes an IP "tunnel" to the requesting user node 102 allowing the required IP traffic between the user node 102 and the server node 124, during which, the server node 124 controls the IP tunnel to prevent a compromised local network layer from gaining unauthorized network access. As can be appreciated by one skilled in the art, "tunneling" is a technique which allows a network to send its data via another network's connections. Tunneling is achieved by encapsulating a first network protocol within packets carried by a second network, and is therefore often referred to as encapsulation. The original packet is encapsulated inside a new packet which provides routing information allowing the packet to travel through internetworks, as directed by an encapsulation header, which may otherwise be restricted. Once the encapsulated packet arrives, the encapsulation header is removed and the original packet is routed to its final destination. Further details regarding IP Tunneling and Encapsulation are set forth in RFC 1853 entitled "IP In IP Tunneling", October 1995, and in RFC 2003 entitled "IP Encapsulation Within IP", October 1996, the entire content of each being incorporated herein by reference.

The direct path taken by the encapsulated data is called a "tunnel" and also serves to restrict incorrectly directed data. Where special handling is required in FIG. 3, the emergency call traffic from the VoIP client user node 102 is encapsulated by the local network layer at 120. Once encapsulated, the encapsulation header provides instructions, routing the emergency call through service layer 122 to the network server node 124, avoiding layer restrictions which may otherwise have blocked the call. When the emergency call is received at server node 124, the node removes the encapsulation from the emergency call traffic and may either forward the VoIP packets to the destination indicated by the header or provide emergency VoIP services directly.

The tunnel established between nodes 102 and 124 in FIG. 3 allows bypassing transport layer restrictions while maintaining network security levels. During periods when a communication tunnel is established between nodes 102 and 124, the service layer 122 continues to block unauthorized traffic from the user node 102 by permitting only traffic having encapsulation headers routing communications to the server node 124. The network server node 124 blocks any unauthorized traffic through the tunnel by permitting only emergency calls which are to be either handled at the server node 124 or routed to a final destination providing emergency call service. Any attempts by the user node 102 to send data packets to any address other than node 124 via the service network layer 122 is blocked by normal network security mechanisms. The service layer 122 between user node 102 and server node 124 will only bypass security for communication traffic to the server node 124. All other traffic from the user node will remain blocked, preventing traffic from going anywhere but between the user device and the server, unless the server node 124 forwards the traffic to another location. In such a case, the server node can act as either a proxy, or relay, for VoIP packets from the requesting user node, or provide emergency call VoIP services directly.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of providing emergency access in a communication network, wherein the communication network includes one or more communication restrictions, the method comprising:
   at a first node:
      detecting an emergency call VoIP signal prior to normal IP security; and
      sending a request for an emergency call connection via an IP transport layer, said transport layer including communication restrictions; and
   at a second node:
      receiving said request;
      establishing a limited emergency call connection with said first node via said IP transport layer, said limited connection bypassing said normal IP security including said communication restrictions;
      allowing transmission of said emergency call VoIP signal from said first node to said second node, and
      blocking all other communications within said limited connection.

2. A method as claimed in claim 1, further comprising at said first node:
   detecting at a local network layer a specific request for an emergency call VoIP signal.

3. A method as claimed in claim 1, further comprising at said first node:
   detecting at a local network layer an emergency call VoIP signal by snooping within received packets.

4. A method as claimed in claim 1, further comprising at said first node:
   locating said second node via a broadcasting mechanism.

5. A method as claimed in claim 1, wherein said establishing said limited emergency call connection between said first and second nodes comprises tunneling said emergency call VoIP signal from said first node to said second node via said secured IP transport layer.

6. A method as claimed in claim 1, further comprising at said second node:
   functioning as a proxy relay for said emergency call VoIP signal.

7. A method as claimed in claim 1, further comprising at said second node:
   providing emergency call VoIP signal service.

8. A method as claimed in claim 1, wherein said network includes a wireless ad-hoc network which includes said local network layer and said secured IP transport layer.

9. A system for allowing emergency call access in a communication network, wherein said communication includes one or more communication restrictions, the system, comprising:

a user node comprising:
- a user node software application for initiating an emergency call using a VoIP application prior to normal IP security,
- a local network layer coupled to the user node software application for sending a request for an emergency call connection to a network server node via an IP transport layer, said transport layer including communication restrictions between said user node and said network server node; and said network server node comprising:
- a means for receiving said request, and in response, establishing a limited emergency call connection between said user node and said network server node via said IP transport layer, said limited connection bypassing said normal IP security including said communication restrictions, allowing transmission of said emergency call VoIP signal while blocking all other communications within said limited connection from said user node to said network server node.

10. A system as claimed in claim 9, wherein said local network layer sends said request in response to detecting a specific request for said emergency call VoIP signal.

11. A system as claimed in claim 9, wherein said local network layer snoops within one or more received packets to detect an emergency call VoIP signal.

12. A system as claimed in claim 9, wherein said local network layer locates said network server node via a broadcasting mechanism.

13. A system as claimed in claim 9, wherein said network server node establishes a limited emergency call connection with said user node by tunneling said emergency call VoIP signal from said user node to said network server node via said secured IP transport layer.

14. A system as claimed in claim 9, wherein said network server node further comprises a proxy relay for said emergency call VoIP signal.

15. A system as claimed in claim 9, wherein said network server node further provides emergency call VoIP signal.

16. A system as claimed in claim 9, wherein said network includes a wireless ad-hoc network which includes said local network layer and said secured IP transport layer.

* * * * *